US008798311B2

(12) United States Patent
Capless

(10) Patent No.: US 8,798,311 B2
(45) Date of Patent: Aug. 5, 2014

(54) SCROLLING DISPLAY OF ELECTRONIC PROGRAM GUIDE UTILIZING IMAGES OF USER LIP MOVEMENTS

(75) Inventor: Jonathan Capless, Bingley (GB)

(73) Assignee: Eldon Technology Limited, Keighley (GB)

( * ) Notice: Subject to any disclaimer, the term of this patent is extended or adjusted under 35 U.S.C. 154(b) by 1031 days.

(21) Appl. No.: 12/358,952

(22) Filed: Jan. 23, 2009

(65) Prior Publication Data
US 2010/0189305 A1 Jul. 29, 2010

(51) Int. Cl.
G06K 9/00 (2006.01)

(52) U.S. Cl.
USPC .......................................... 382/100

(58) Field of Classification Search
USPC ........................... 382/100, 181, 155
See application file for complete search history.

(56) References Cited

U.S. PATENT DOCUMENTS

| 4,975,960 | A | 12/1990 | Petajan |
| 5,473,726 | A | 12/1995 | Marshall |
| 5,586,215 | A | 12/1996 | Stork et al. |
| 5,621,858 | A | 4/1997 | Stork et al. |
| 5,680,481 | A | 10/1997 | Prasad et al. |
| 5,689,575 | A | 11/1997 | Sako et al. |
| 5,802,220 | A | 9/1998 | Black et al. |
| 6,028,960 | A | 2/2000 | Graf et al. |
| 6,295,391 | B1 * | 9/2001 | Rudd et al. ...................... 382/313 |
| 6,502,082 | B1 * | 12/2002 | Toyama et al. .................. 706/16 |
| 7,072,686 | B1 * | 7/2006 | Schrager .................... 455/556.1 |
| 7,127,081 | B1 | 10/2006 | Erdem |
| 7,272,243 | B2 | 9/2007 | Toyama |
| 7,848,917 | B2 * | 12/2010 | Soong et al. ...................... 704/9 |
| 7,930,762 | B1 * | 4/2011 | Blair et al. ....................... 726/28 |
| 8,032,383 | B1 * | 10/2011 | Bhardwaj et al. ............. 704/275 |
| 8,087,054 | B2 * | 12/2011 | Zacks et al. ...................... 725/86 |
| 2002/0010589 | A1 * | 1/2002 | Nashida et al. ............... 704/275 |
| 2002/0052746 | A1 * | 5/2002 | Handelman .................... 704/270 |
| 2002/0157098 | A1 * | 10/2002 | Zustak et al. .................... 725/51 |
| 2002/0178344 | A1 * | 11/2002 | Bourguet et al. ................. 712/1 |
| 2002/0194005 | A1 * | 12/2002 | Lahr ............................... 704/271 |
| 2003/0058341 | A1 * | 3/2003 | Brodsky et al. ............... 348/169 |
| 2003/0215114 | A1 * | 11/2003 | Kyle ............................. 382/115 |
| 2004/0120554 | A1 * | 6/2004 | Lin et al. ......................... 382/118 |
| 2004/0123316 | A1 * | 6/2004 | Kendall et al. .................. 725/37 |
| 2005/0132420 | A1 * | 6/2005 | Howard et al. ............... 725/135 |
| 2006/0117347 | A1 * | 6/2006 | Steading .......................... 725/39 |
| 2007/0139514 | A1 * | 6/2007 | Marley ....................... 348/14.01 |
| 2007/0174057 | A1 * | 7/2007 | Genly ........................... 704/270 |
| 2007/0182595 | A1 * | 8/2007 | Ghasabian ..................... 341/22 |
| 2007/0199022 | A1 * | 8/2007 | Moshiri et al. .................. 725/39 |
| 2007/0239432 | A1 * | 10/2007 | Soong et al. ...................... 704/9 |
| 2007/0259717 | A1 * | 11/2007 | Mattice et al. .................. 463/36 |
| 2008/0022323 | A1 * | 1/2008 | Koo ................................ 725/81 |
| 2008/0059174 | A1 * | 3/2008 | Hershey et al. ............... 704/240 |

(Continued)

Primary Examiner — Nirav G Patel
(74) Attorney, Agent, or Firm — Lowe Graham Jones PLLC

(57) ABSTRACT

Systems and methods of generating device commands based upon spoken user commands are disclosed. An exemplary embodiment captures a series of images of a user of a media device, generates image information corresponding to the series of captured images, determines lip movement of the user from the generated image information, determines at least one spoken user command based upon the determined lip movement of the user, and determines a device command based upon the determined spoken user command. Then, the device command is communicated to, for example, a media presentation device, wherein an operation of the media presentation device is controlled in accordance with the determined spoken user command.

24 Claims, 2 Drawing Sheets

(56) References Cited

U.S. PATENT DOCUMENTS

| | | | |
|---|---|---|---|
| 2008/0059578 A1* | 3/2008 | Albertson et al. | 709/204 |
| 2008/0154613 A1* | 6/2008 | Haulick et al. | 704/275 |
| 2008/0192984 A1* | 8/2008 | Higuchi et al. | 382/104 |
| 2009/0108762 A1* | 4/2009 | Chen | 315/159 |
| 2009/0138805 A1 | 5/2009 | Hildreth | |
| 2009/0146848 A1* | 6/2009 | Ghassabian | 341/22 |
| 2009/0164113 A1* | 6/2009 | Kang | 701/200 |
| 2009/0326604 A1* | 12/2009 | Tyler et al. | 607/45 |
| 2010/0026817 A1* | 2/2010 | Ryan et al. | 348/207.11 |
| 2010/0083313 A1* | 4/2010 | White et al. | 725/39 |
| 2010/0085446 A1* | 4/2010 | Thorn | 348/239 |
| 2010/0146545 A1* | 6/2010 | Hilton | 725/38 |
| 2010/0160048 A1* | 6/2010 | Rabin et al. | 463/43 |
| 2010/0161339 A1* | 6/2010 | De Mers et al. | 704/275 |
| 2011/0010591 A1* | 1/2011 | Damola et al. | 714/57 |
| 2011/0161852 A1* | 6/2011 | Vainio et al. | 715/769 |
| 2013/0285951 A1* | 10/2013 | Jeon et al. | 345/173 |

* cited by examiner

SCROLLING DISPLAY OF ELECTRONIC PROGRAM GUIDE UTILIZING IMAGES OF USER LIP MOVEMENTS

BACKGROUND

Often, controlling a set top box (STB) that operates a media device or system using a remote control is difficult or inconvenient. For example, a parent holding an infant may have difficulty in reaching for and using the remote control. As another example, a person eating dinner while watching a television (TV) may have difficulty in reaching for and using the remote control. Further, in some instances, a person may have lost their remote control and would have to make changes to their media system using the manual controls on the STB and/or the media device or system.

In some situations, it may be physically impossible for a person to operate a remote control. For example, a person with severe physical disabilities may not have sufficient control of their hands and/or fingers to manually operate the remote control. As another example, a person in a hospital recovering from surgery may not be able to reach and/or operate the remote control.

One possible solution to the above-described problem of not being able to operate a remote control is the use of a speech or voice recognition technology. However, media devices typically present sounds to the user. For example, the user may be listening to music presented on their radio or stereo. As another example, the media device may be presenting both video images and sounds, such as when a user is viewing a movie. Accordingly, the sounds emitted from the media device must be distinguished from verbal commands of the user. In many situations, distinguishing between sounds emitted from the media device and the verbal commands of the user renders such speech or voice recognition systems inefficient or even inoperable.

SUMMARY

Systems and methods of generating device commands based upon spoken user commands are disclosed. An exemplary embodiment captures a series of images of a user of a media device, generates image information corresponding to the series of captured images, determines lip movement of the user from the generated image information, determines at least one spoken user command based upon the determined lip movement of the user, and determines a device command based upon the determined spoken user command. Then, the device command is communicated to, for example, a media presentation device, wherein an operation of the media presentation device is controlled in accordance with the determined spoken user command.

BRIEF DESCRIPTION OF THE DRAWINGS

Preferred and alternative embodiments are described in detail below with reference to the following drawings.

DETAILED DESCRIPTION

Figure 1:
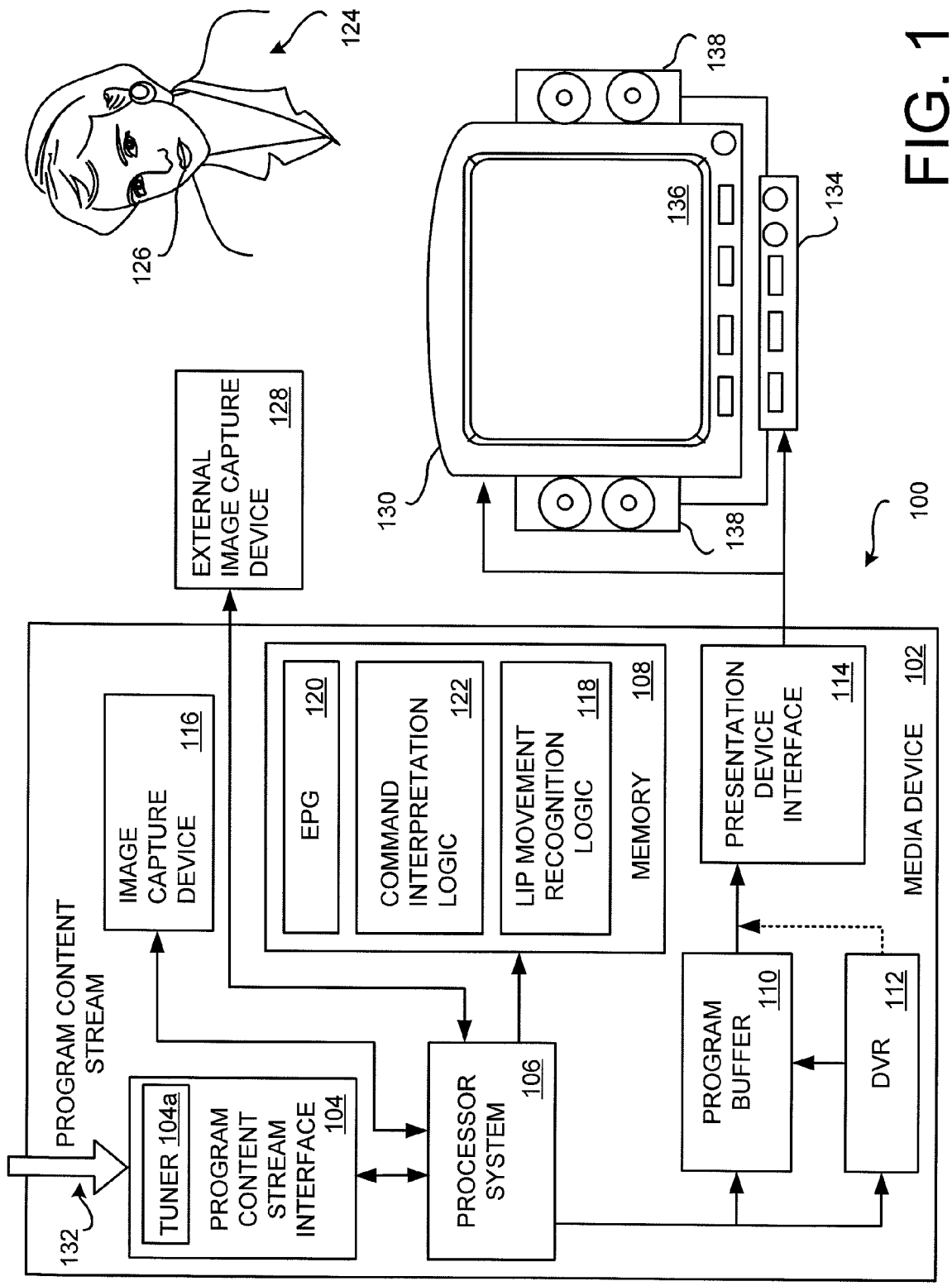
FIG. 1 is a block diagram of a lip reading control system that is operable to control a media device.

FIG. 1 is a block diagram of a lip reading control system 100 that is operable to control a media device 102, such as, but not limited to, a set top box (STB). Embodiments of the lip reading control system 100 may be implemented in other media devices, such as, but not limited to, stereos, radios, televisions (TVs), digital video disc (DVD) players, digital video recorders (DVRs), or a personal computer (PC).

The non-limiting exemplary media device 102 comprises a program content stream interface 104, a processor system 106, a memory 108, a program buffer 110, an optional digital video recorder (DVR) 112, a presentation device interface 114, and an optional image capture device 116. The memory 108 comprises portions for storing the lip movement recognition logic 118, the electronic program guide (EPG) 120, and the command interpretation logic 122. Other media devices may include some, all, or none of the above-described media processing components. Further, additional components not described herein may be included in alternative embodiments.

As noted above, a user 124 may not be able to input commands using a remote control (not shown) or using buttons or other actuators on the media device 102. Embodiments of the lip reading control system 100 capture images using the image capture device 116 to monitor movement of the user's lips 126. Based upon the movement of the user's lips, presumably corresponding to verbally issued user commands, embodiments of the lip reading control system 100 determine and/or generate one or more media device commands. That is, based upon the determined spoken user commands, the media device 102 can then control various media devices in accordance with the determined user commands.

As noted above, many media presentation devices issue sounds, such as music from a stereo or dialogue from a movie. Accordingly, it may not be possible to differentiate sounds issued from the media presentation device and words spoken by a user 124. Here, embodiments of the lip reading control system 100 avoid such problems by determining user commands based upon the user's lip movements.

In some embodiments, the image capture device 116 is pointed outwardly from the media device 102 in a direction that is anticipated to result in captured images of the user 124. Alternatively, or additionally, an external image capture device 128, which may be portable, may be positioned so as to be pointed towards the user 124. For example, the media device 102 may be located behind the user, yet control the television 130 located on the other side of the media room. Thus, the external image capture device 128 may be independently placed and oriented in another location in the media room. The external image capture device 128 may communicate captured image information to the media device 102 using any suitable communication medium, including physical wires, light, or radio frequency (RF).

The image capture devices 116, 128 are operable to capture a sequential series of images of the user 124. Image information corresponding to the captured images is then generated and communicated to the processor system 106. The time between successive captured images must be short enough so as to provide a meaningful interpretation of the movement of the user's lips. In some embodiments, the image capture device may be a video camera. Accordingly, image information generated from a plurality of selected still images captured by the video camera are processed to determine the lip movements of the user 124.

The functionality of the media device 102, here a set top box, is now broadly described. One or more program content streams 132 are received by the program content stream interface 104. One or more tuners 104a in the program content stream interface 104 selectively tune to one of the program content streams 132 in accordance with instructions received from the processor system 106. A program content stream 132 typically comprises a plurality of programs multiplexed together. The processor system 106, based upon a request for a program of interest specified by a user 124, parses out program content associated with the program of interest. The program content is then assembled into a stream of video and/or audio information which may be saved into the program buffer 110 such that the program content can be streamed out to the media presentation device, such as the television 130, via the presentation device interface 114. Alternatively, or additionally, the parsed out program content may be saved into the DVR 112 for later presentation.

In this simplified embodiment, the presentation device interface 114 is illustrated as coupled to two exemplary media presentation devices, the television (TV) 130 and a surround-sound receiver 134. The video portion of the streamed program content is displayed on the TV display 136 and the audio portion of the streamed program content is reproduced as sounds by the speakers 138.

From time to time, information populating the EPG 120 portion of the memory 108 is communicated to the media device 102 via the program content stream 132. The EPG 120 portion of the memory 108 stores the information pertaining to the scheduled programming. The information may include, but is not limited to, a scheduled presentation start and/or end time, a program channel, and descriptive information. The program's descriptive information may include the title of the program, names of performers or actors, date of creation, and a summary describing the nature of the program. Any suitable information may be included in the program's supplemental information. Upon receipt of a command from the user 124 requesting presentation of an EPG display, the information in the EPG 120 is retrieved, formatted, and then presented on the display 136.

A user, by speaking user commands, moves their lips 126. The lip movement recognition logic 118 monitors the user's lip movements, and based upon the user's lip movements, determines what the user 124 is saying.

Conceptually describing operation of the lip reading control system 100, embodiments of the lip movement recognition logic 118 analyze image data received from the image capture device 116 and/or the external image capture device 128. Features of the background and the user are identified to determine the location of the user's lips in the received image information. Movement of the user's lips is based upon the movement of predefined points on the user's lips 126, known as markers or the like. The movement of the markers are tracked to determine what the user is saying. The words of the user are then correlated with corresponding words associated with user commands. Then, the command interpretation logic 122 generates the appropriate device commands based upon the determined speech of the user 124. The device commands are then issued to the controlled media presentation device, such as the television 130.

For example, the user 124 may wish to scroll through the displayed EPG and select a program of interest. The user may say "scroll downward" or the like (a verbal user command). The image capture device 116, and/or the external image capture device 128, is capturing a real-time image of the user 124, and hence an image of the user's moving lips 126. Based upon the movement of predefined points on the user's lips 126, the lip movement recognition logic 118 determines that the user said "scroll downward" or the like. The command interpretation logic 122 then, based upon what the user 124 has said, generates a corresponding device command that causes a highlighted portion on the displayed EPG to scroll downward.

Any suitable lip movement recognition logic 118 may be used in the various embodiments of the lip reading control system 100. Such lip movement recognition systems and methods are well known and are not described herein for brevity.

However, special features of the lip movement recognition logic 118 are applicable to embodiments of the lip reading control system 100, and are now conceptually described by their functionality. For example, one exemplary feature requires distinguishing a plurality of users 124 from the background artifacts in a captured image. Thus, a movement of a plurality of lips may be monitored to determine if any of the users are issuing spoken user commands intended to operate a media presentation device. Such multiple user recognition systems and methods are well known and are not described herein for brevity.

Another optional exemplary feature employed by some embodiments of the lip reading control system 100 include an engagement command feature. A special spoken engagement command must be first detected prior to the lip reading control system 100 issuing a device command. Thus, ordinary conversation between a plurality of users will not inadvertently result in a generation of a device command that is issued to a media presentation device. Here, a keyword or phrase is stored in memory 108. Language from the one or more users is continuously monitored. When the lip reading control system 100 determines that one of the users has spoken the engagement command keyword or phrase, that user is monitored for spoken user commands that are expected to be forthcoming. Some embodiments may also include a disengagement command feature such that, upon detecting the user speaking a disengagement command keyword or phrase, the lip reading control system 100 then becomes configured to disregard further speech from that user. That is, subsequent spoken user commands are disregarded after determining the disengagement command.

In some embodiments, the lip reading control system 100 will include an optional learning function that allows the lip reading control system 100 to recognize a particular user, and to better identify spoken commands from that user. For example, accents or the like may be different between users, and thus, their differing accents may result in different types of lip movement for the same user command.

Accordingly, a particular user 124 may present a series of user commands to the lip reading control system 100. The lip reading control system 100 "remembers" the movement of the user's lips for the series of commands. Then, during operation, detected lip movement may be compared with the learned lip movement associated with the series of commands to more reliably determine the words from the user. The learning feature may be particularly useful for users having physical speech impediments.

Also, some embodiments may learn that some users are not authorized to issue user commands. For example, children may be recognized from adults who are exclusively authorized to issue spoken user commands. A user command from the unauthorized children may then be disregarded, even if the children attempt to cause the lip reading control system 100 to issue device commands based upon their words (or their lip movement). Such learning systems and methods are well known and are not described herein for brevity.

In some embodiments, optional functionality may be included to determine user commands spoken in a plurality of different languages. For example, lip movement for a user command spoken in the English language will be quite different from the same user command spoken in the French, German, or Chinese languages. The determination may be made from a specific user input or predefined input. Alternatively, the lip movement may be used to determine spoken words, which are then correlated with a set of predefined languages to determine the language of the user. Thus, embodiments are operable to distinguish user commands for different languages. Such multiple language recognition systems and methods are well known and are not described herein for brevity.

Some embodiments may analyze lip movement of a user based upon captured image information provided by more than one image capture device. Upon determination of a spoken user command based upon lip movement captured by a first image capture device, image information from a second image capture device, or a plurality of other image capture devices, is used to verify the user command. That is, commands that are determined from multiple images are compared, and then issued as device commands when the comparison verifies that the user has spoken a particular user command.

Figure 2:
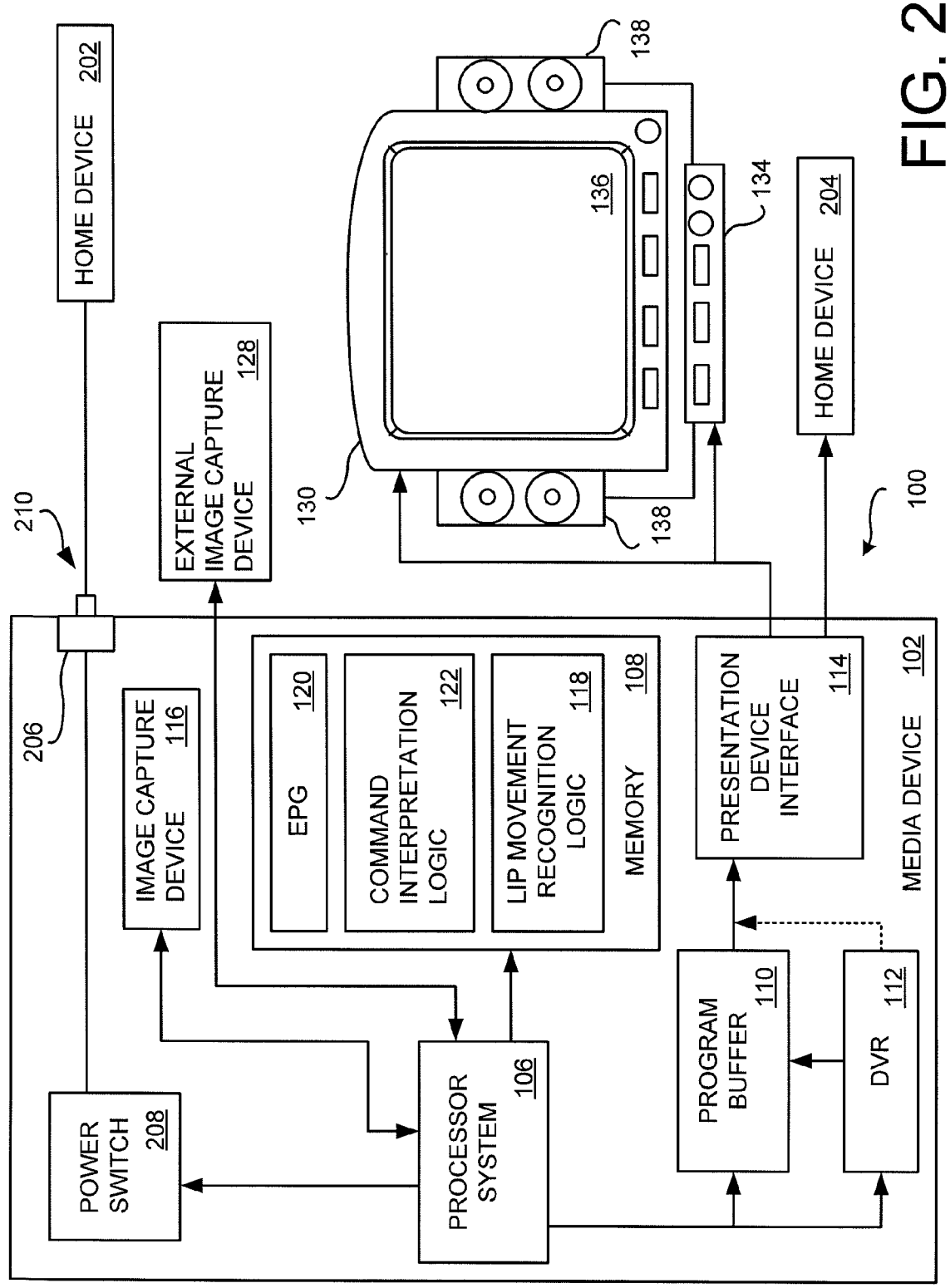
FIG. 2 is a block diagram of a lip reading control system that is operable to control other devices.

FIG. 2 is a block diagram of a lip reading control system 100 that is operable to control other home devices 202 and 204. In some embodiments, the media device 102 in which an embodiment of the lip reading control system 100 is implemented in includes one or more electrical outlets 206 that are operable to provide power to the home device 202. The processor system 106 is controllably coupled to a power switch 208 that controls delivery of power to the electrical outlet 206. When the home device 202 has its power cord 210 coupled to the power outlet 206, a user command may be issued to power the home device 202.

Here, the user speaks a user command having two portions. The first portion is an identifier of the home device 202. The second portion of the user command is what action to take, here, turning on or turning off the home device 202. For example, assume that the home device 202 is a lamp. The user says "turn on the lamp." The user's lip movements are used to determine the spoken user command that identifies the home device 202 (the lamp) and the action to take (provide power to the lamp). A device command is generated by the processor system 106 and is sent to the power switch 208. The power switch 208 then provides the power at the electrical outlet 206. Thus, the lamp is turned on.

More complex device commands may be generated by embodiments of the lip reading control system 100. Such commands may be communicated directly to the home device 204, or may be communicated directly to the home device 204 via the presentation device interface 114. Any suitable home device 204 may thus be controlled by the media device 102.

It should be emphasized that the above-described embodiments of the lip reading control system 100 are merely possible examples of implementations of the invention. Many variations and modifications may be made to the above-described embodiments. All such modifications and variations are intended to be included herein within the scope of this disclosure and protected by the following claims.

What is claimed is:

1. A set top box (STB) configured to generate device commands based upon spoken user commands, comprising:
an image capture device configured to capture a series of images of a user, and configured to generate image information corresponding to the series of captured images;
a memory configured to store electronic program guide (EPG) information;
a tuner configured to receive programming and the EPG information from a remote source; and
a processor system communicatively coupled to the image capture device, the memory, and the tuner,
wherein the processor system is configured to:
generate an electronic program guide (EPG) from the EPG information that is displayed on a display,
receive the image information from the image capture device that includes movement of the user's lips,
continuously monitor movement of the user's lips in the series of captured images of the user to determine an engagement command, a disengagement command, and at least one STB command associated with scrolling about the displayed EPG, wherein the engagement command, the disengagement command and the at least one STB command are based upon identified lip movements of the user shown in the captured image information,
determine a device command to scroll about the EPG based upon the corresponding determined STB command,
wherein the determined STB command is disregarded until after the engagement command is determined,
wherein the device command associated with the determined STB command is determined after the engagement command is determined, and
wherein a subsequent determined STB command is disregarded after the disengagement command is determined.

2. The STB of claim 1, further comprising:
a presentation device interface coupled to the processor system and at least one media presentation device with the display, wherein the device command controls operation of the EPG displayed by the media presentation device.

3. The STB of claim 1, wherein the image capture device resides as a component within the STB.

4. The STB of claim 1, further comprising:
an external image capture device that is external to the STB, that is communicatively coupled to the processor system, and that is operable to generate image information corresponding to the series of captured images.

5. The STB of claim 1, wherein the at least one STB command is a first STB command based upon first identified lip movements of the user, and wherein the image information from the image capture device is used to determine a second STB user command based upon next identified lip movements of the user, wherein the first identified lip movements are next followed by the next identified lip movements, and wherein the second STB command is compared with the first STB command to verify the first STB command.

6. The STB of claim 1, further comprising:
a power switch controllably coupled to the processor system; and
at least one electrical outlet coupled to the power switch, wherein the electrical outlet is operable to provide power to a home device via a power cord of the home device that is coupled to the electrical outlet,
wherein the processor system is configured to monitor movement of the user's lips to determine a home device command,
wherein the home device command corresponds to a request to turn on the home device, and
wherein the processor system causes the power switch to provide power to the electrical outlet in response to determining the home device command.

7. The STB of claim 1, wherein the STB is a video camera.

8. A method for generating device commands to control a set top box (STB) based upon spoken user commands, the method comprising:

displaying an electronic program guide (EPG) on a display, wherein the EPG presents availability of programs that may be presented by the STB;

capturing a series of images of a plurality of users in a media room viewing the displayed EPG; generating image information corresponding to the series of captured images;

identifying an authorized user from among the plurality of users in the series of captured images;

determining lip movement of the authorized user from the generated image information;

continuously monitoring the lip movement of the authorized user;

determining an engagement command from the continuously monitored lip movement of the authorized user;

determining, only after determining the engagement command, at least one spoken user command associated with scrolling about the displayed EPG based upon the determined lip movement of the user;

determining a STB device command, wherein the STB device command is configured to scroll about the EPG based upon the determined spoken user command; and scrolling about the EPG in response to determining the STB device command.

9. The method of claim 8, further comprising:
communicating a media presentation device command to a media presentation device, wherein the media presentation device command corresponds to the STB device command, and wherein an operation of the media presentation device is controlled in accordance with the determined STB device command that is based upon the spoken user command.

10. The method of claim 8, wherein the STB is communicatively coupled to a television.

11. The method of claim 8, further comprising:
determining a plurality of lip movements of the plurality of users from the generated image information; and
determining at least one spoken user command based upon the plurality of determined lip movements of the plurality of users,
wherein the STB device command associated with the determined engagement command and the determined at least one spoken user command is determined only when the determined lip movement is from the authorized user.

12. The method of claim 11, further comprising:
identifying at least one of the users from the plurality of users as an unauthorized user; and
disregarding the spoken user command from the identified unauthorized user.

13. The method of claim 8, further comprising:
determining a language that is spoken by the user, wherein the spoken user command based upon the determined lip movement of the user is further based upon the determined language.

14. The method of claim 8, further comprising:
determining that the STB device command is associated with a home device; and
communicating a device command to a power switch, wherein the home device receives power from an electrical outlet controlled by the power switch.

15. The method of claim 8, wherein the determined spoken user command identifies a home device and an action for the home device, and further comprising:
generating a device command based upon the action; and
communicating the device command to the identified home device.

16. The method of claim 8, further comprising:
communicating the STB device command to the media presentation device only after determining the engagement command, wherein an operation of the media presentation device is controlled in accordance with the determined next spoken user command.

17. The method of claim 8, further comprising:
determining a disengagement command based upon the plurality of determined lip movements of the plurality of users,
wherein further STB device commands determined from words spoken by the authorized user are disregarded in response to the disengagement command.

18. The method of claim 8, further comprising:
learning a plurality of spoken user commands from the authorized user, wherein a current spoken user command is determined from the plurality of learned spoken user commands and from the determined lip movement of the authorized user.

19. The method of claim 8, wherein the at least one spoken user command is a first spoken user command based upon first identified lip movements of the authorized user, and further comprising:
capturing a second series of images of the authorized user with an external image capture device;
generating second image information corresponding to the captured second series of images;
determining a second lip movement of the authorized user from the generated second image information; and
verifying the determined first spoken user command based upon the determined second lip movement determined from the generated second image information.

20. The method of claim 8, wherein capturing the series of images of the authorized user is captured by a still image capture device.

21. The method of claim 8, wherein capturing the series of images of the authorized user is captured by a video image capture device, and comprising:
selecting the series of images of the authorized user from a video captured by the video image capture device.

22. A television controller system that generates device commands to control a television based upon spoken user commands, comprising:
a tuner residing in a set top box (STB), and wherein the STB is configured to receive programming and electronic program guide (EPG) information from a remote source;
a display configured to display the received programming and an electronic program guide (EPG) that is generated based upon the received EPG information;
an image capture device configured to capture a series of images of a user, and configured to generate image information corresponding to the series of captured images; and
a processor system communicatively coupled to the image capture device, the display and the tuner,
wherein the processor system is configured to:
generate the EPG from the EPG information,
receive the image information from the image capture device,
determine an engagement command based upon identified lip movements of the user shown in the captured image information,
determine, only after determining the engagement command, at least one spoken user command associated with scrolling about the displayed EPG based upon the identified lip movements of the user shown in the captured image information, determine, only after determining the engagement command, a disengagement command based upon the identified lip movements of the user shown in the captured image information, and determine a device command that scrolls about the EPG based upon the determined spoken user command, wherein the determined device command is disregarded until after the engagement command is determined, wherein the device command associated with the determined device command is determined after the engagement command is determined, and wherein a subsequent determined device command is disregarded after the disengagement command is determined.

23. The television controller system of claim 22, wherein the tuner, the image capture device and the processing system reside in the STB that is communicatively coupled to the television.

24. The television controller system of claim 22, further comprising:

a digital video recorder configured to store the received programming for a later presentation on the display.

\* \* \* \* \*